US006756133B2

(12) United States Patent
Palmer et al.

(10) Patent No.: US 6,756,133 B2
(45) Date of Patent: Jun. 29, 2004

(54) HIGH TEMPERATURE ALUMINUM ALLOY BRAZING SHEET AND METHODS OF MANUFACTURING AND USES THEREFOR

(75) Inventors: Scott L. Palmer, Parkersburg, WV (US); Zayna M. Connor, Ripley, WV (US); H. Scott Goodrich, Millwood, WV (US)

(73) Assignee: Pechiney Rolled Products LLC, Ravenswood, WV (US)

( * ) Notice: Subject to any disclaimer, the term of this patent is extended or adjusted under 35 U.S.C. 154(b) by 53 days.

(21) Appl. No.: 10/085,139

(22) Filed: Mar. 1, 2002

(65) Prior Publication Data

US 2002/0168541 A1 Nov. 14, 2002

Related U.S. Application Data

(60) Provisional application No. 60/272,451, filed on Mar. 2, 2001, provisional application No. 60/290,028, filed on May 11, 2001, provisional application No. 60/323,076, filed on Sep. 19, 2001, and provisional application No. 60/347,001, filed on Jan. 11, 2002.

(51) Int. Cl.$^7$ .................... B32B 15/20; B32B 31/26; C22F 1/04
(52) U.S. Cl. .................. 428/654; 148/528; 148/535; 148/700
(58) Field of Search ................. 428/654; 148/528, 148/535, 700

(56) References Cited

U.S. PATENT DOCUMENTS

| 5,857,266 A | 1/1999 | Raybould et al. |
| 5,863,669 A | * 1/1999 | Miller .................... 428/654 |
| 5,957,286 A | 9/1999 | Ho |

FOREIGN PATENT DOCUMENTS

| EP | 0241125 A1 | 10/1987 |
| EP | 0718072 A1 | 6/1996 |
| EP | 0823305 A2 | 2/1998 |
| EP | 1038984 A1 | 9/2000 |
| FR | 2614 901 | 11/1988 |
| JP | 06057361 | 3/1994 |
| WO | WO 82/01014 | 4/1982 |
| WO | WO 94/22633 | 10/1994 |
| WO | WO 98/20178 | 5/1998 |
| WO | WO 99/55925 | 11/1999 |

OTHER PUBLICATIONS

International Search Report, PCT/EP02/03319, Sep. 9, 2002, pp. 1–5.
H. Scott Goodrich et al. "Aging Response and Elevated Temperature Strengthening in Brazing Sheet Core Alloys of 3xxx Series Aluminum", no date.
N.D.A. Kooij et al, "New High Strength Alloys for Brazing with Long Life Corrosion Properties" VTMS Conf. Proc., Indianapolis, IN 971882, 1997, no month given.
N.D.A. Kooij et al, "The Development of Two High Strength Aluminium Brazing Sheet Alloys With Long Life Corrosion Properties", Alumintech Conf. Proc., Atlanta, GA, 1997, pp. 185–190, no month given.
H. Scott Goodrich et al, "Age Hardening Effects in 3xxx Series Brazing Sheet Core Alloys" VTMS 4 Conf. Proc. I Mech E 1999, London, p. 483, no month given.
"International Alloy Designations and Chemical Composition Limits for Wrought Aluminum and Wrought Aluminum Alloys", The Aluminum Association, Jul. 1998, pp. 1–21.

* cited by examiner

Primary Examiner—Robert R. Koehler
(74) Attorney, Agent, or Firm—Connolly, Bove, Lodge & Hutz LLP

(57) ABSTRACT

The present invention provides an aluminum alloy brazing sheet material, particularly suitable for charge air cooler applications, comprising a core alloy and a clad brazing alloy, as well as to methods for their manufacture and use. The present invention also provides a method for increasing the yield strength of brazing sheet materials.

19 Claims, 1 Drawing Sheet

HIGH TEMPERATURE ALUMINUM ALLOY BRAZING SHEET AND METHODS OF MANUFACTURING AND USES THEREFOR

PRIORITY CLAIM

The present application claims priority to provisional applications Serial No. 60/272,457, filed Mar. 2, 2001; Serial No. 60/290,028, filed May 11, 2001; Serial No. 60/323,076, filed Sep. 19, 2001; Serial No. 60/347,001, filed Jan. 11, 2002, the content of which are each incorporated herein by reference in their entireties.

BACKGROUND OF THE INVENTION

1. Field of the Invention

The present invention relates generally to materials and methods applicable to brazing sheet materials and in particular to aluminum alloys that maintain strength at high temperatures such as those that are required for automotive, vehicular, or industrial heat exchangers, and specifically in charge air coolers, as well as methods for their manufacture and use.

2. Description of Related Art

Strength enhancement of aluminum brazing sheet at room and elevated temperatures is desirable towards downgauging for weight saving and higher operating temperatures in various heat exchanger applications. Aluminum brazing sheet typically includes a core alloy of 3xxx and a lower melting braze clad of 4xxx series. 3xxx and 4xxx are designations as set forth by The Aluminum Association. As 3xxx series aluminum alloys are generally non-heat treatable, solid solution strengthening is the primary source of enhancing as-brazed strength. However, precipitation hardening to some extent is possible if magnesium is present in the core alloy. Age hardening in 3005 based brazing sheets was demonstrated in earlier work. (See for example, N. D. A. Kooij, J. A. H. Sontgerath, A. Bürger, K. Vieregge, A. Haszler, "New High Strength Alloys for Brazing with Long Life Corrosion Properties", VTMS Conf. Proc., Indianapolis, Ind. 971882 (1997); N. D. A. Kooij, J. A. H. S ontgerath, A. Bürger, K. Vieregge, A. Haszler, "The Development of Two High Strength Aluminum Brazing Sheet Alloys with Long Life Corrosion Properties", Alumitech Conf. Proc., Atlanta, Ga. (1997) p. 185–190; WO 99/55925 from Hoogovens Aluminium Walzprodukte "Aluminium Alloy for Use in a Brazed Assembly"; and H. Scott Goodrich and G. S. Murty, "Age hardening effects in 3xxx series brazing sheet core alloys", VTMS 4 Conf. Proc., I Mech E 1999, London, p. 483, which are incorporated herein by reference in their entireties).

One mechanism of age hardening involves (i) diffusion of silicon from the braze clad into the core alloy, (ii) retention of silicon and magnesium in solution during cooling from the braze cycle, and (iii) then the precipitation of $Mg_2Si$ during subsequent vehicle operation or post-braze aging treatment. However, 3xxx alloys are generally not heat treatable, and the primary strengthening mechanism is by solid solution strengthening. It has been reported that age hardening of materials that included Mg in the core material such as 3005 was possible.

In a published study, Goodrich et al., "Age hardening effects in 3xxx series brazing sheet core alloys", VTMS 4 Conf. Proc., I Mech E 1999, London, p.483, which is incorporated herein by reference in its entirety, the aging response of different brazing sheets was monitored through room temperature tensile tests performed immediately after brazing and after aging for various times at 104° C., 150° C., 175° C. and 200° C. As the actual heat exchanger operating temperature is generally higher than room temperature, the material properties at elevated temperatures are of interest from a design standpoint. This especially applies to charge air coolers which are used in turbocharged engines and in diesel engines to cool the intake air compressed by the turbocharger prior to its injection into the cylinder chamber. This is done by employing an air-to-air heat exchanger (known in the automobile and truck industry as an intercooler or charge-air-cooler). The cooled and compressed air results in maximum performance derived from turbocharging, which lowers emission levels and improves fuel efficiencies. Charge air coolers are exposed to extreme temperature fluctuations and elevations in use, and as such, their construction in terms of metallurgy has proven difficult to design. Standard 3xxx series alloy such as 3003 alloys have been used in the past in some heat exchanger applications since they are easily formed into sheet, fins and tubes. However, they have relatively low strength and generally cannot be used in applications that require subjection to high temperatures. Different aluminum alloys have been used to construct charge air coolers including 3003, but the 3xxx series alloys, while being brazeable, are generally too soft to adequately machine or have the necessary mechanical properties at high temperatures to be acceptable for use in applications such as in charge air coolers. Moreover, the materials must be able to exhibit sufficient strength after long-term exposure to temperatures greater than about 177° C. Many vehicle manufacturers have turned to copper and brass for designing materials useful in the manufacture of charge air coolers since these materials can operate at the temperatures required for a charge air cooler (i.e. up to peak temperatures of about 250–300° C.). However, copper and brass are much heavier and costlier than aluminum, and as a result, typically cost more to operate in terms of fuel efficiency given their added weight. Thus it would be desirable to have an aluminum alloy that is suitable for use under the conditions required for charge air coolers without using copper/brass alloys. Since the use of turbocharged engines is increasing in both automobiles and trucks, there have been increasing demands on aluminum alloy suppliers to obtain a material that has good formability and acceptable strength over the complete temperature profile that is required for operating a charge air cooler.

An example of additional strengthening at elevated temperatures in charge air cooler alloys was reported by Raybould and Capriotti LaSalle in U.S. Pat. No. 5,857,266, "Heat Exchanger Having Aluminum Alloy Parts Exhibiting High Strength at Elevated Temperatures," the content of which is incorporated herein by reference in its entirety.

SUMMARY OF THE INVENTION

In accordance with these and other objects, the present invention provides aluminum alloy brazing sheet materials that have an increase in yield strength when the materials have been exposed to high temperatures for extended periods of time (i.e. temperatures of from 100–250° C. or 260° C., for times up to 2500 hours) greater than would have been expected. Such increases in yield strength of the inventive brazing sheet materials may be obtained by subjecting the aluminum alloy to a post braze aging treatment. The increase in yield strength of the core materials is unexpectedly retained, even after the materials are subjected to high temperatures for an extended period of time or when the materials are exposed to very high temperatures that would be found in the case of heat exchanger components, particularly in heat exchanger applications where downgauging would be advantageous such as for header material and most particularly charge air coolers.

In further accordance with the present invention, there is provided a brazing sheet material comprising a core in 3xxx series alloy that includes at least one dispersoid forming element in an amount sufficient to increase the yield strength of the brazing sheet by up to about 20% in a peak age temper, as compared to the alloy in an as-brazed temper.

In further accordance with the present invention, there is provided a brazing sheet material comprising a core in a 3xxx series alloy of the following preferred composition (in weight % based on the weight of the core alloy): Si<0.2%, Fe<0.2%, Cu: 0.3%–0.7%, Mn: 1.3%–1.7%, Mg: 0.4%–0.8%, Ti<0.10% and at least one element selected from the group consisting of Cr (preferably 0.05%–0.20%), Sc (preferably 0.05%–0.20%), V (preferably 0.05%–0.20%), Zr (preferably 0.05%–0.20%), Hf (preferably 0.05%–0.20%) Ni (preferably 0.20%–1%), balance aluminum and unavoidable impurities. In preferred embodiments, the inventive brazing sheet material has been subjected to a treatment sufficient to maintain an increase in strength over a wide temperature range.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF A PREFERRED EMBODIMENT

Figure 1:
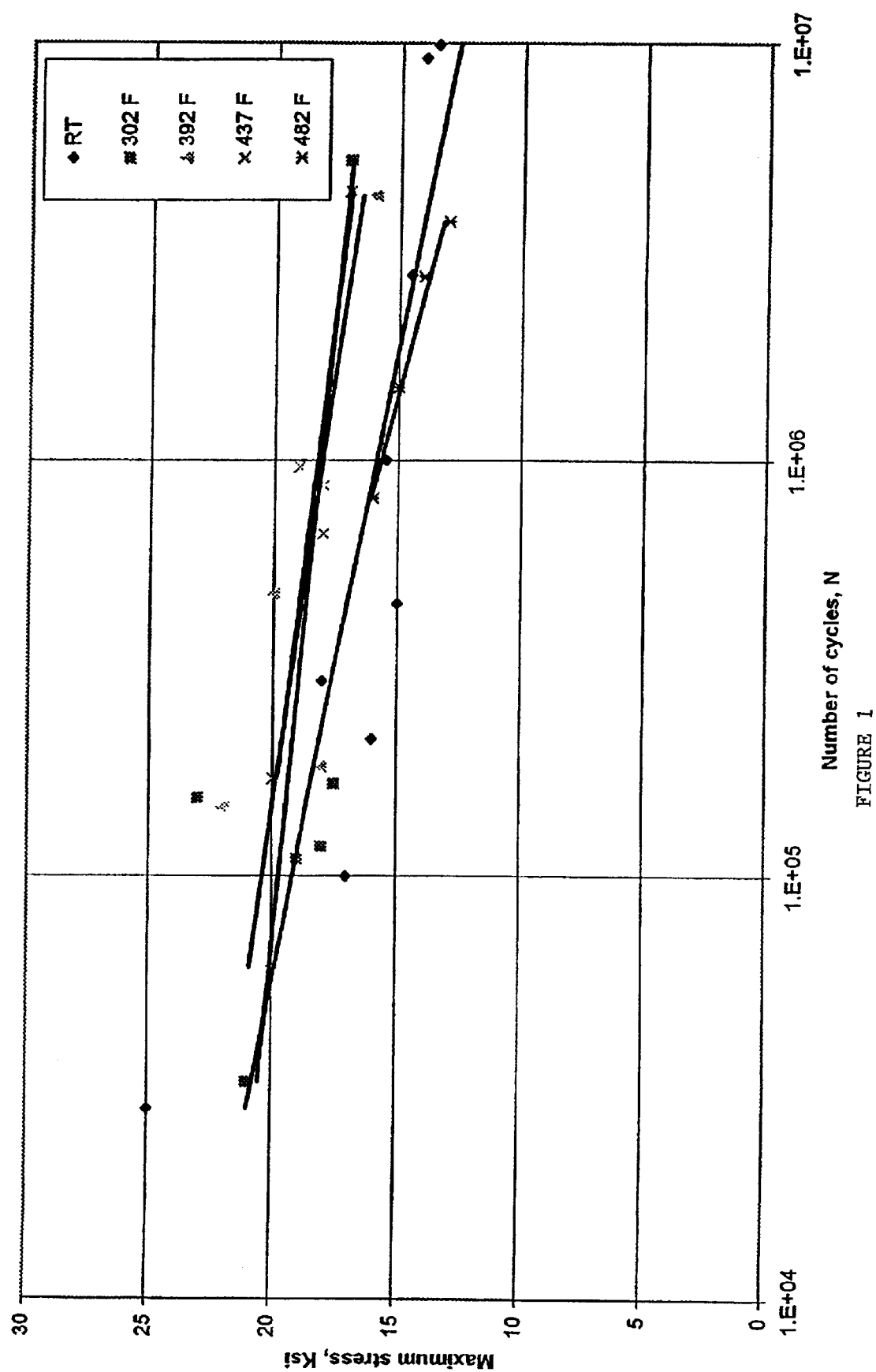
FIG. 1 is a graph depicting typical fatigue data of the instant alloy at various temperatures and according to the results from Example 2.

The term "peak age" refers to a treatment where a brazing alloy is subjected to a brazing cycle and then aged at various temperatures and times to determine its "peak age," i.e., that time and temperature combination where the maximum strength is observed. For example, tensile properties of a particular material can be evaluated in its as-brazed temper and after aging for various times up to 2500 hours for example, at various temperatures such as 104° C., 175° C., 225° C. and 250° C. Any times and temperatures for aging could be utilized in order to determine the peak age for a particular material, the ones listed are merely exemplary. The specimen could then be cooled to room temperature before tensile tests were performed. A specimen from each aging temperature could be tensile tested at room temperature, while another specimen from each aging temperature can be reheated and tensile tested at its respective elevated aging temperatures. The extent of age hardening retained at different operating temperatures can then be evaluated. Note that peak-age treatment could be subjected to a material during manufacture as a deliberate process step and/or a peak age treatment could occur during utilization of the material under natural conditions such as when the material has been formed into a heat exchanger part.

In connection with the present invention, it was found that a peak-aged alloy according to the invention shows yield strength at 175° C. that is up to 20% greater (or potentially even greater than 20%) than the as-brazed yield strength at the same temperature. In some embodiments, a peak-aged alloy according to the present invention shows a yield strength at 175° C. that is about 17% greater in the peak-age temper as compared with the same material in an as-brazed temper. In addition, at 225° C., the yield strength is about 13% greater in a peak-age temper as compared with an as-brazed temper.

To prepare brazing sheet materials of the present invention, advantageously a core alloy that includes a percentage of Mg (i.e. generally at least 0.4–0.7%) is brazed with a cladding that includes silicon. During the brazing cycle, a $Mg_2Si$ precipitate is formed by virtue of the Si from the clad migrating to the Mg of the core. The formation of these precipitates detract from the strength of the as-brazed material and hence their usability at high temperatures since the precipitates will coalesce during use when exposed to the kind of extreme temperatures that product such as a charge air cooler will encounter (i.e. over 177° C. for period from 10 to 2500 hours, particularly from 50 to 100 hours, or even at temperatures up to 250° C., 260° C. or 300° C.).

Cr, Zr, Sc, V and Hf are dispersoid forming elements that along with aluminum and silicon precipitate during homogenization to typically form small particles (i.e. from 0.05–0.5 $\mu$m in diameter). The formation of such precipitates is well known in the art. Note that dispersoid precipitates are formed during homogenization and are usually much smaller than those eutectic constituents formed during casting that are 0.5–10 $\mu$m, since they are typically the last particles to solidify.

In a preferred alloy of the present invention, the Mg and Mn levels are increased to some degree from those typically employed in a high copper 3003 alloy (i.e., a 3003 alloy that includes an increased Cu content). Mg is preferably included in an amount from 0.4–0.8% and Mn is preferably included in an amount from 1.3–1.7%. In another embodiment of the present invention, a quantity of Ni is included in the alloy. While typically Ni is not present in brazing sheet materials such as 3003, according to one embodiment of the present invention, Ni is included in an amount from between 0.2–1%, more preferably from 0.3–0.65%, and suitably, around 0.5% for some embodiments. While Ni is generally not known to be a dispersoid forming element, its inclusion in materials according to the present invention has unexpectedly been found to increase the tensile strength properties of brazing sheet materials.

If Sc is a dispersoid forming element included in the alloy and not a naturally occurring trace, Sc is preferably present in an amount from 0.05–0.2%, more preferably from 0.08–0.15%;

If V is a dispersoid forming element included in the alloy, and not a naturally occurring trace, V is preferably present in an amount from 0.05–0.2%, more preferably from 0.08–0.15%;

If Zr is a dispersoid forming element included in the alloy, and not a naturally occurring trace, Zr is preferably present in an amount from 0.05–0.2%, more preferably from 0.08–0.15%.

If Hf is a dispersoid forming element included in the alloy, and not a naturally occurring trace, Hf is preferably present in an amount from 0.05–0.2%, more preferably from 0.08–0.15%.

In an alternative embodiment, at least two dispersoid forming elements are included in the brazing sheet core material. In this regard, the inclusion of at least two dispersoid forming elements is believed to provide a synergistic effect in terms of the increase in tensile strength (yield strength). In another embodiment, Ni is included along with a dispersoid forming element. According to one preferred embodiment, the composition of a material according to the present invention comprises:

| | | | Chemical Composition (weight percent) | | | | |
|---|---|---|---|---|---|---|---|
| Alloy | Si | Fe | Cu | Mn | Mg | Cr | Zn | Ti |
| Core Alloy | <0.2 | <0.2 | 0.3–0.7 | 1.3–1.7 | 0.4–0.8 | 0.05–0.20 | — | <0.10 |

The material can be subjected, for example, to H24 temper as well known in the industry.

All weights expressed herein are weight percentages based on the total weight of the alloy.

The following examples are provided to further illustrate the invention. These examples do not limit the invention in any form or manner.

EXAMPLE 1

A material having the following composition:

| Si | Fe | Cu | Mn | Mg | Cr | Ti |
|---|---|---|---|---|---|---|
| 0.03 | 0.04 | 0.46 | 1.65 | 0.72 | 0.12 | 0.03 | was cast, clad with 4045 braze alloy, hot rolled to a thickness of 2.8 mm, annealed 2 hours at 371° C., and cold rolled to 0.305 mm. It was characterized after being subjected to H24 temper by annealing 2 hours at 282° C. (pre-braze), after brazing (post-braze), and after having been subjected to a post-braze-peak-aging; tensile properties were evaluated at different temperatures in the as-brazed temper, in comparison to the peak-aged temper.

The tensile properties (yield strength, ultimate tensile strength, and % elongation) in the pre-brazed temper are reported below:

| | Pre-braze (H24 Temper) Tensile properties of Charge Air Cooler alloy | | |
|---|---|---|---|
| | Pre-braze | | |
| Specimen # | YS, ksi (MPa) | UTS, ksi (MPa) | % elongation. |
| 1 | 29.23 (201.5) | 33.24 (229.2) | 6.5 |
| 2 | 29.10 (200.6) | 33.13 (228.4) | 7.9 |
| 3 | 28.95 (199.6) | 32.72 (225.6) | 6.5 |
| 4 | 29.20 (201.3) | 33.27 (229.4) | 7.4 |
| Mean | 29.12 (200.8) | 33.09 (228.2) | 7.1 |

The tensile properties (yield strength, ultimate tensile strength, and % elongation) in the as-brazed temper at different temperatures are reported below:

| Tensile properties of Charge Air Cooler alloy (As Brazed) | | | | |
|---|---|---|---|---|
| | | Post-braze | | |
| Test Temperature | Specimen # | YS, ksi (MPa) | UTS, ksi (MPa) | % elongation |
| RT | 1 | 13.54 (93.4) | 29.90 (206.2) | 14.0 |
| | 2 | 13.44 (92.7) | 30.05 (207.2) | 14.0 |
| | Mean | 13.49 (93.1) | 29.98 (206.7) | 14.0 |
| 212° F. (100° C.) | 1 | 14.35 (98.9) | 26.90 (185.5) | 10.0 |
| | 2 | 12.68 (87.4) | 26.67 (183.9) | 12.6 |
| | Mean | 13.52 (93.2) | 26.79 (184.7) | 11.3 |
| 302° F. (150° C.) | 1 | 14.37 (99.1) | 26.81 (184.9) | 9.2 |
| | 2 | 14.08 (97.1) | 27.87 (192.2) | 12.0 |
| | Mean | 14.23 (98.1) | 27.34 (188.6) | 10.6 |
| 347° F. (175° C.) | 1 | 14.04 (96.8) | 25.48 (175.7) | 7.7 |
| | 2 | 13.53 (93.3) | 24.80 (171.0) | 8.6 |
| | Mean | 13.79 (95.1) | 25.14 (173.4) | 8.2 |
| 392° F. (200° C.) | 1 | 13.38 (92.3) | 24.10 (166.1) | 13.4 |
| | 2 | 12.77 (88.1) | 23.83 (164.3) | 13.7 |
| | Mean | 13.08 (90.2) | 23.97 (165.2) | 13.6 |
| 437 (225° C.) | 1 | 13.65 (94.1) | 22.17 (152.9) | 11.8 |
| | 2 | 12.90 (88.9) | 21.92 (151.1) | 12.3 |
| | Mean | 13.28 (91.5) | 22.05 (152.0) | 12.1 |
| 482° F. (250° C.) | 1 | 12.43 (85.7) | 17.01 (117.3) | 13.0 |
| | 2 | 13.47 (92.9) | 18.63 (128.4) | 10.8 |
| | Mean | 12.95 (89.3) | 17.82 (122.9) | 11.9 |
| 527° F. (275° C.) | 1 | 12.66 (87.3) | 14.73 (101.5) | 10.4 |
| | 2 | 11.76 (81.1) | 14.76 (101.8) | 10.9 |
| | Mean | 12.21 (84.2) | 14.75 (101.7) | 10.7 |
| 572° F. (300° C.) | 1 | 10.28 (70.9) | 10.71 (73.8) | 8.2 |
| | 2 | 10.96 (75.6) | 11.57 (79.8) | 6.4 |
| | Mean | 10.62 (73.3) | 11.14 (76.8) | 7.3 |
| 617° F. (325° C.) | 1 | 9.76 (67.3) | 10.63 (73.3) | 7.3 |
| | 2 | 10.31 (71.1) | 10.67 (73.6) | 7.4 |
| | Mean | 10.04 (69.2) | 10.65 (73.5) | 7.4 |

The table below summarizes the as-brazed results:

Tensile properties of Charge Air Cooler alloy (As brazed) - Summary

| Test Temperature | Post-braze YS, ksi (MPa) | Post-braze UTS, ksi (MPa) | % elong. |
|---|---|---|---|
| RT | 13.49 (93.1) | 29.98 (206.7) | 14.0 |
| 212° F. (100° C.) | 13.52 (93.2) | 26.79 (184.7) | 11.3 |
| 302° F. (150° C.) | 14.23 (98.1) | 27.34 (188.6) | 10.6 |
| 347° F. (175° C.) | 13.79 (95.1) | 25.14 (173.4) | 8.2 |
| 392° F. (200° C.) | 13.08 (90.2) | 23.97 (165.2) | 13.6 |
| 437° F. (225° C.) | 13.28 (91.5) | 22.05 (152.0) | 12.1 |
| 482° F. (250° C.) | 12.95 (89.3) | 17.82 (122.9) | 11.9 |
| 527° F. (275° C.) | 12.21 (84.2) | 14.75 (101.7) | 10.7 |
| 572° F. (300° C.) | 10.62 (73.3) | 11.14 (76.8) | 7.3 |
| 617° F. (325° C.) | 10.04 (69.2) | 10.65 (73.5) | 7.4 |

The tensile properties (yield strength, ultimate tensile strength, and % elongation) in the peak-aged temper at different temperatures are reported below:

Tensile properties of Charge Air Cooler alloy (Peak Aged)

| Test Temperature | Specimen # | Post-braze & peak aged YS, ksi (MPa) | Post-braze & peak aged UTS, ksi (MPa) | % elong. |
|---|---|---|---|---|
| RT | 1 | 16.19 (111.6) | 30.55 (206.2) | 11.4 |
|  | 2 | 15.99 (110.3) | 30.09 (207.2) | 10.8 |
|  | Mean | 16.09 (111.0) | 30.32 (206.7) | 11.1 |
| 212° F. (100° C.) | 1 | 16.86 (116.3) | 28.24 (194.7) | 8.3 |
|  | 2 | 17.38 (119.8) | 28.44 (196.1) | 8.1 |
|  | Mean | 17.12 (118.1) | 28.34 (195.4) | 8.2 |
| 302° F. (150° C.) | 1 | 17.16 (118.3) | 28.21 (194.5) | 9.8 |
|  | 2 | 16.97 (117.0) | 27.51 (189.6) | 9.3 |
|  | Mean | 17.07 (117.7) | 27.86 (192.1) | 9.6 |
| 347° F. (175° C.) | 1 | 16.46 (113.5) | 25.01 (172.4) | 8.7 |
|  | 2 | 16.94 (116.8) | 25.93 (178.8) | 8.9 |
|  | Mean | 16.70 (115.2) | 25.47 (175.6) | 8.8 |
| 392° F. (200° C.) | 1 | 16.14 (111.3) | 24.48 (168.8) | 11.3 |
|  | 2 | 15.77 (108.7) | 24.25 (167.2) | 11.3 |
|  | Mean | 15.96 (110.0) | 24.37 (168.0) | 11.3 |
| 437 (225° C.) | 1 | 15.61 (107.6) | 21.78 (150.2) | 9.5 |
|  | 2 | 15.48 (106.7) | 21.21 (146.2) | 9.8 |
|  | Mean | 15.55 (107.2) | 21.50 (148.2) | 9.7 |
| 482° F. (250° C.) | 1 | 14.99 (103.4) | 16.31 (112.5) | 6.2 |
|  | 2 | 14.65 (101.0) | 17.68 (121.9) | 8.7 |
|  | Mean | 14.82 (102.2) | 17.00 (117.2) | 7.5 |
| 527° F. (275° C.) | 1 | 13.14 (90.6) | 13.76 (94.9) | 5.2 |
|  | 2 | 12.85 (88.6) | 14.01 (96.6) | 6.1 |
|  | Mean | 13.00 (89.6) | 13.89 (95.8) | 5.7 |
| 572° F. (300° C.) | 1 | 11.25 (77.5) | 11.61 (80.0) | 7.0 |
|  | 2 | 11.78 (81.2) | 11.85 (81.7) | 6.0 |
|  | Mean | 11.52 (79.4) | 11.73 (80.9) | 6.5 |
| 617° F. (325° C.) | 1 | 10.57 (72.9) | 11.39 (78.5) | 7.5 |
|  | 2 | 9.78 (67.4) | 10.48 (72.3) | 6.9 |
|  | Mean | 10.18 (70.2) | 10.94 (75.4) | 7.2 |

The table below summarizes the peak-aged results:

Tensile properties of Charge Air Cooler alloy (Peak Aged) - summary

| Test Temperature | Post-braze & Peak Aged YS, ksi (MPa) | Post-braze & Peak Aged UTS, ksi (MPa) | % elong. |
|---|---|---|---|
| RT | 16.09 (111.0) | 30.32 (206.7) | 11.1 |
| 212° F. (100° C.) | 17.12 (118.1) | 28.34 (195.4) | 8.2 |
| 302° F. (150° C.) | 17.07 (117.7) | 27.86 (192.1) | 9.6 |
| 347° F. (175° C.) | 16.70 (115.2) | 25.47 (175.6) | 8.8 |
| 392° F. (200° C.) | 15.96 (110.0) | 24.37 (168.0) | 11.3 |
| 437° F. (225° C.) | 15.55 (107.2) | 21.50 (148.2) | 9.7 |
| 482° F. (250° C.) | 14.82 (102.2) | 17.00 (117.2) | 7.5 |
| 527° F. (275° C.) | 13.00 (89.6) | 13.89 (95.8) | 5.7 |
| 572° F. (300° C.) | 11.52 (79.4) | 11.73 (80.9) | 6.5 |
| 617° F. (325° C.) | 10.18 (70.2) | 10.94 (75.4) | 7.2 |

These results show a level of yield strength of the alloy according to the invention, in the as-brazed temper. All samples tested are above 90 MPa at 175° C., and above 88 MPa at 225° C. These levels of yield strength are unexpectedly raised to more than 110 MPa in the post-brazed-peak-aged temper at 175° C., and remain above 100 MPa in the post-braze-peak-aged temper at 250° C. This is of particular interest in the production of materials that must maintain yield strength and/or ultimate tensile strength even after being exposed to high temperatures for extended period of time. In particular, such materials include charge air cooler and other related heat exchanger applications.

EXAMPLE 2

Uniaxial constant amplitude fatigue testing at different temperature was performed on the material of Example 1 according to ASTM-E 466-82 standard. A constant amplitude load was applied with R=0.1 and test frequency of 10 Hz. Stress range was from 13.5 to 25 ksi (125 to 172 MPa). Specimen dimensions were 0.5 "(12.7 mm) width 2" (50 mm) uniform gauge.

9 samples were tested at room temperature (RT), 6 samples were tested at 302° F. (150° C.), 5 samples were tested at 392° F. (200° C.), 5 samples were tested at 437° F. (225° C.) and 4 samples were tested at 482° F. (250° C.).

Corresponding results are plotted on FIG. 1, and show that the fatigue performance of the alloy according to the invention at high temperatures is comparable to its fatigue performance at room temperature. There is no significant loss of fatigue performance at high temperature, which is of particular interest in charge air coolers, where the typical operating temperature is about 177° C.

EXAMPLE 3

Material from Example 1 was tested in terms of SWAAT according to ASTM G85 in two tempers:
1. as brazed
2. after an aging treatment to the peak was performed ("Post Braze—Peak-aged").
Six samples were tested in each temper. The data obtained are reported below:

|  | Sample # | Number of hours |  |
|---|---|---|---|
| (As brazed) | 1 | 1080 | mean |
|  | 2 | 1188 | 1214 |
|  | 3 | 1356 | Std. Dev. = 140 |
|  | 4 | 1032 |  |
|  | 5 | 1260 |  |
|  | 6 | 1368 |  |
| (Post Braze - Peak aged) | 1 | 1236 | mean |
|  | 2 | 936 | 1188 |
|  | 3 | 1356 | Std. Dev. = 140 |
|  | 4 | 1308 |  |
|  | 5 | 1212 |  |
|  | 6 | 1092 |  |

From the SWAAT test data reported above, it can be seen that materials according to the present invention meet and in fact surpass the typical performance required for such materials in the industry. Materials according to the present invention show a similar performance as materials without an aging treatment. SWATT data greater than about 800 hours is considered in the industry as more than what is required. Typical requirements generally do not exceed 800 hours.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

As used herein and in the following claims, articles such as "the", "a" and "an" can connote the singular of plural.

All document referred to herein are specifically incorporated herein by reference in their entireties.

What is claimed is:

1. An aluminum alloy brazing sheet material comprising a core alloy and a clad brazing alloy, wherein when said sheet material is peak aged, said sheet material being capable of having a room temperature yield strength of at least about 111 MPa, and wherein said core alloy comprises in weight percent based on the weight of the core alloy:
   Si<0.2%
   Fe<0.2%
   Mn:1.3–1.7%
   Mg:0.4–0.8%
   Cu:0.3–0.7%
   Ti<0.2%
   and at least one element selected from the group consisting of Cr, Sc, V, Zr, Hf, and Ni, and
   balance aluminum and unavoidable impurities.

2. An aluminum alloy brazing sheet material according to claim 1, wherein at least two elements selected from the group consisting of Cr, Sc, V, Zr, Hf, and Ni, are included.

3. An aluminum alloy brazing sheet material as claimed in claim 1, wherein Sc is included and is present in an amount from 0.08 to 0.15%.

4. An aluminum alloy brazing sheet material as claimed in claim 1, wherein V is included and is present in an amount from 0.08–0.15%.

5. An aluminum alloy brazing sheet material as claimed in claim 1, wherein Zr is included and is present in an amount from 0.08–0.15%.

6. An aluminum alloy brazing sheet material as claimed in claim 1, wherein Ni is included and is present in an amount from 0.3 to 0.65%.

7. An aluminum alloy brazing sheet material as claimed in claim 1, that is capable of being used at temperatures of up to at least 325° C.

8. A method for increasing the yield strength of an aluminum alloy brazing sheet material such that said sheet material is capable of having a room temperature yield strength of at least about 111 MPa, said method comprising at least a core alloy and a clad alloy, wherein the method comprises:
   subjecting said brazing sheet material to a brazing cycle, to form an as-brazed sheet material, and
   subjecting the as-brazed sheet material to aging at its peak-aged temperature,
   wherein said core alloy comprises in percent by weigh: based on the weight of the core alloy:
   Si<0.2%
   Fe<0.2%
   Mn:1.3–1.7%
   Mg:0.4–0.8%
   Cu:0.3–0.7%
   Ti<0.1%,
   at least one element from the group consisting of Cr, Sc, V, Zr, Hf and Ni, and balance Al and unavoidable impurities.

9. A method according to claim 8, wherein Ni is present in the core alloy in an amount from 0.3 to 0.65 weight %.

10. A charge air cooler prepared from an aluminum alloy brazing sheet material as claimed in claim 1.

11. An aluminum alloy brazing sheet material according to claim 1, which exhibits a yield strength>90 MPa at 175° C., when in an as-brazed temper.

12. An aluminum alloy brazing sheet material according to claim 11, which exhibits a yield strength>110 MPa, at 175° C., when in a post-braze-peak-aged temper.

13. An aluminum alloy brazing sheet material according to chum 1, which exhibits a yield strength>88 MPa at 225° C., when in an as-brazed temper.

14. An aluminum alloy brazing sheet material according to claim 1, which exhibits a yield strength>100 MPa at 225° C., when in the post-braze-peak-aged temper.

15. An aluminum alloy brazing sheet material according to claim 1, that exhibits a yield strength in the peak aged temper that is up to 20% higher than in the as-brazed temper at 225° C.

16. An aluminum brazing sheet material as claimed in claim 1, wherein, when said at least one element is Cr, Sc, V, Zr, or Hf, said element is present in an amount from 0.05–0.2%, and when said at least one element is Ni, said element is present in an amount from 0.20–1.0%.

17. A method according to claim 8, wherein when said at least one element is Cr, Sc, V, Zr, or Hf said element is present in an amount from 0.05–0.20% and, when said at least one element is Ni, said element is present in an amount from 0.20–1.0%.

18. A method according to claim 8, wherein said method renders said brazing sheet material suitable for use in the manufacture of a charge air cooler.

19. An aluminum alloy brazing sheet material according to claim 1, which exhibits a yield strength in the peak aged temper that is about 17% higher than in the as-brazed temper at 175° C. and about 13% higher at 225° C.

* * * * *